United States Patent
Hong et al.

(10) Patent No.: US 7,436,393 B2
(45) Date of Patent: Oct. 14, 2008

(54) TOUCH PANEL FOR DISPLAY DEVICE

(75) Inventors: Hee Jung Hong, Seoul (KR); Nam Yong Kong, Seongnam-shi (KR); Tae Ho You, Incheon-Kwangyokshi (KR); Hee Jeong Park, Bucheon-shi (KR); Cheon Suck Lee, Suwon-shi (KR)

(73) Assignee: LG Display Co., Ltd., Seoul (KR)

( * ) Notice: Subject to any disclaimer, the term of this patent is extended or adjusted under 35 U.S.C. 154(b) by 449 days.

(21) Appl. No.: 10/704,705

(22) Filed: Nov. 12, 2003

(65) Prior Publication Data

US 2004/0104899 A1 Jun. 3, 2004

(30) Foreign Application Priority Data

Nov. 14, 2002 (KR) .................... 10-2002-0070794

(51) Int. Cl.
- *G06F 3/041* (2006.01)
- *G06F 3/045* (2006.01)
- *G06F 3/033* (2006.01)
- *G06K 11/06* (2006.01)
- *G08C 21/00* (2006.01)
- *G06F 3/042* (2006.01)
- *G06F 3/043* (2006.01)

(52) U.S. Cl. .............. 345/173; 345/174; 345/175; 345/176; 345/177; 345/178; 345/179; 178/18.01; 178/18.02; 178/18.03; 178/18.04; 178/18.05; 178/18.06

(58) Field of Classification Search ......... 345/173–179; 178/18.01–18.06

See application file for complete search history.

(56) References Cited

U.S. PATENT DOCUMENTS

| | | | |
|---|---|---|---|
| 5,220,324 A | | 6/1993 | Morita |
| 5,402,151 A | * | 3/1995 | Duwaer ................... 345/173 |
| 5,670,755 A | * | 9/1997 | Kwon ..................... 178/18.05 |
| 5,792,997 A | * | 8/1998 | Fukuzaki ................ 178/18.07 |
| 5,869,791 A | * | 2/1999 | Young .................... 178/20.01 |
| 6,057,903 A | * | 5/2000 | Colgan et al. ............ 349/139 |
| 6,239,788 B1 | * | 5/2001 | Nohno et al. ............. 345/173 |
| 6,373,474 B1 | * | 4/2002 | Katabami ................ 345/173 |
| 6,380,497 B1 | * | 4/2002 | Hashimoto et al. ......... 200/5 A |
| 6,400,359 B1 | * | 6/2002 | Katabami ................ 345/173 |
| 6,417,846 B1 | | 7/2002 | Lee |
| 6,888,537 B2 | * | 5/2005 | Benson et al. ............ 345/173 |

FOREIGN PATENT DOCUMENTS

| | | |
|---|---|---|
| JP | 07-295723 | 9/1997 |
| WO | WO 02/075438 A1 | 9/2002 |

* cited by examiner

*Primary Examiner*—Sumati Lefkowitz
*Assistant Examiner*—Alexander S Beck
(74) *Attorney, Agent, or Firm*—McKenna Long & Aldridge LLP

(57) ABSTRACT

A touch panel for a display device integrates functionality provided by resistive-type and EM-type touch panels. The touch panel is integrated with the display device and includes a resisitve-type touch panel arranged above the display device and an EM-type touch panel arranged below the display device.

5 Claims, 8 Drawing Sheets

TOUCH PANEL FOR DISPLAY DEVICE

This application claims the benefit of the Korean Application No. P2002-70794 filed on Nov. 14, 2002, which is hereby incorporated by reference for all purposes as if fully set forth herein.

BACKGROUND OF THE INVENTION

1. Field of the Invention

The present invention relates to touch panels for display devices. More particularly, the present invention relates to combination resistive-type and electromagnetic type touch panels for display devices.

2. Discussion of the Related Art

Touch panels have been developed as a means of efficiently interfacing with electronic devices via a display surface. For example, users may input desired information using a touch panel integrated with a display device while watching images displayed by the display device. Allowing users to input desired information to an electronic device via a display surface, touch panels substantially reduce or eliminate the need for other types of input devices (e.g., keyboards, mice, remote controllers, and the like). Currently, touch panels have been widely integrated with display surfaces of flat panel display devices such as liquid crystal display (LCD) devices, plasma display panel (PDP) devices, electroluminescence (EL) devices, and cathode ray tubes (CRTs).

Depending on the type of contact object used (e.g., a user's finger, a stylus, etc.), and depending on the manner in which the location of a contact point (i.e., the location where the contact object is operably proximate the touch panel) is determined, touch panels are generally classifiable as analog resistive-type, capacitive-type, electromagnetic (EM)-type, saw-type, and infrared-type touch panels.

Generally, analog resistive-type touch panels include an upper transparent substrate supporting an upper electrode and a lower transparent substrate supporting a lower electrode. The upper and lower transparent substrates are attached to each other but spaced apart from each other by a predetermined distance. When a surface of the upper transparent substrate is contacted by a contact object, an upper electrode formed on the upper transparent substrate electrically contacts a lower electrode formed on the lower transparent substrate. When the upper and lower electrodes electrically contact each other, a voltage, made variable by a resistance value or a capacitance value specific to the location of where the contact object contacted the touch panel (i.e., the contact point), is then detected and outputted along with a location defined by coordinates of the contact point.

Generally, capacitive-type touch panels include a transparent electrode formed on a display device such as an LCD panel, wherein a voltage is applied to each corner or side of the transparent electrode and a uniform electric field is thereby generated within the transparent electrode. Coordinates of the contact point are determined in accordance with a voltage drop generated when the user touches the touch panel via the contact object.

Figure 1:
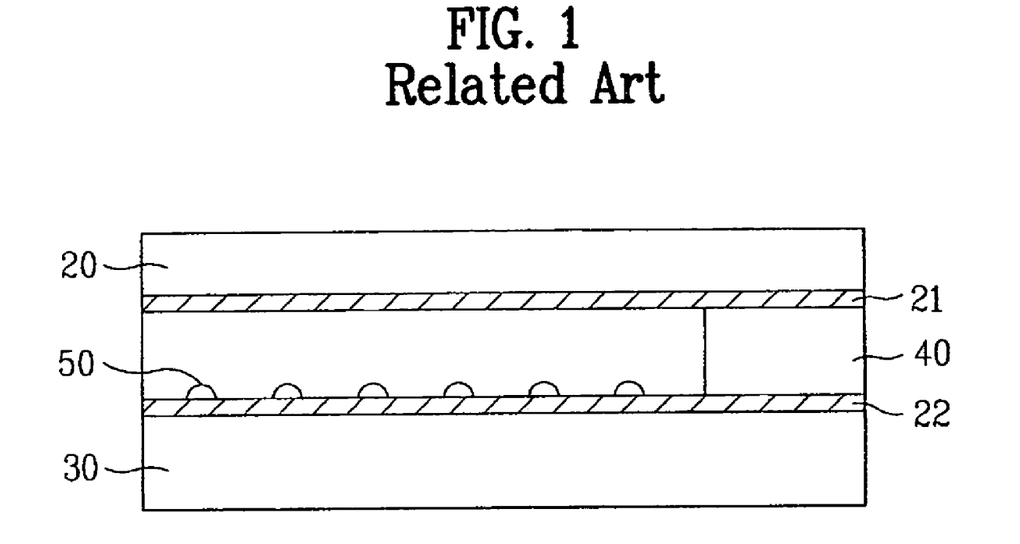
FIG. 1 illustrates a cross-sectional view of a related art resistive-type touch panel.
Figure 2A:
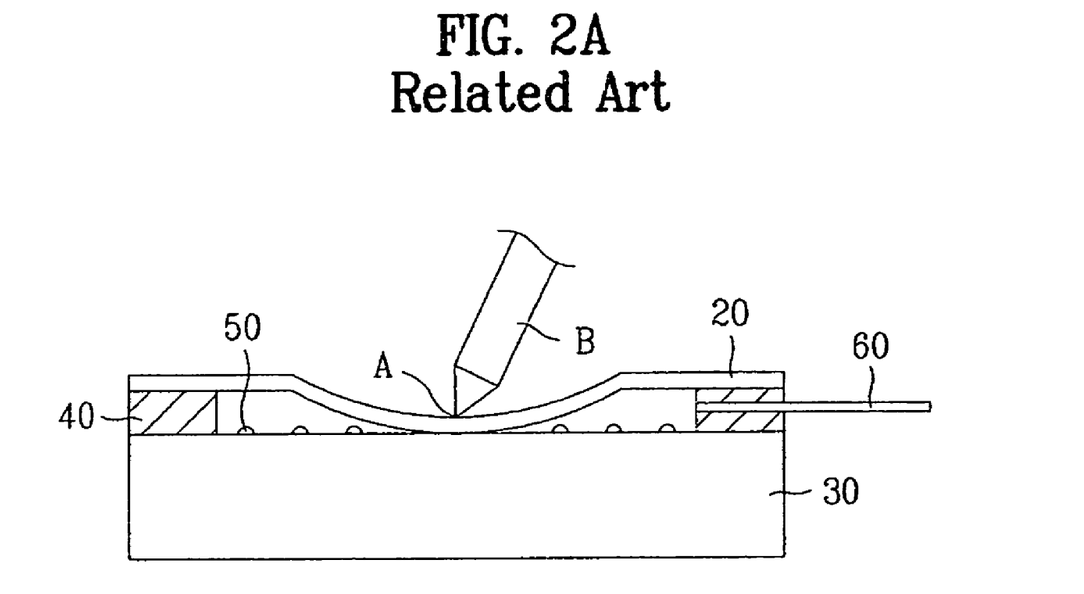
FIGS. 2A to 2C illustrate a method by which a contact point location on a related art resistive-type touch panel is detected.
Figure 2B:
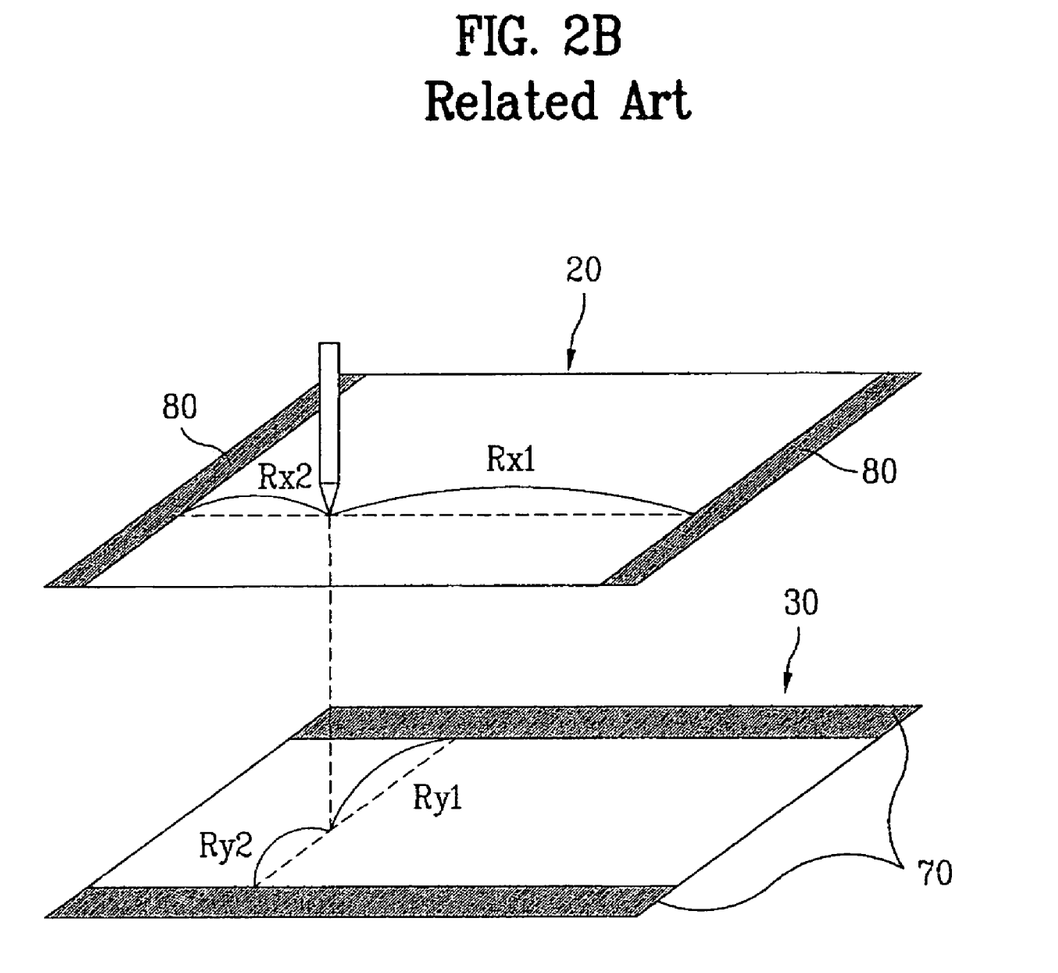
Figure 2C:
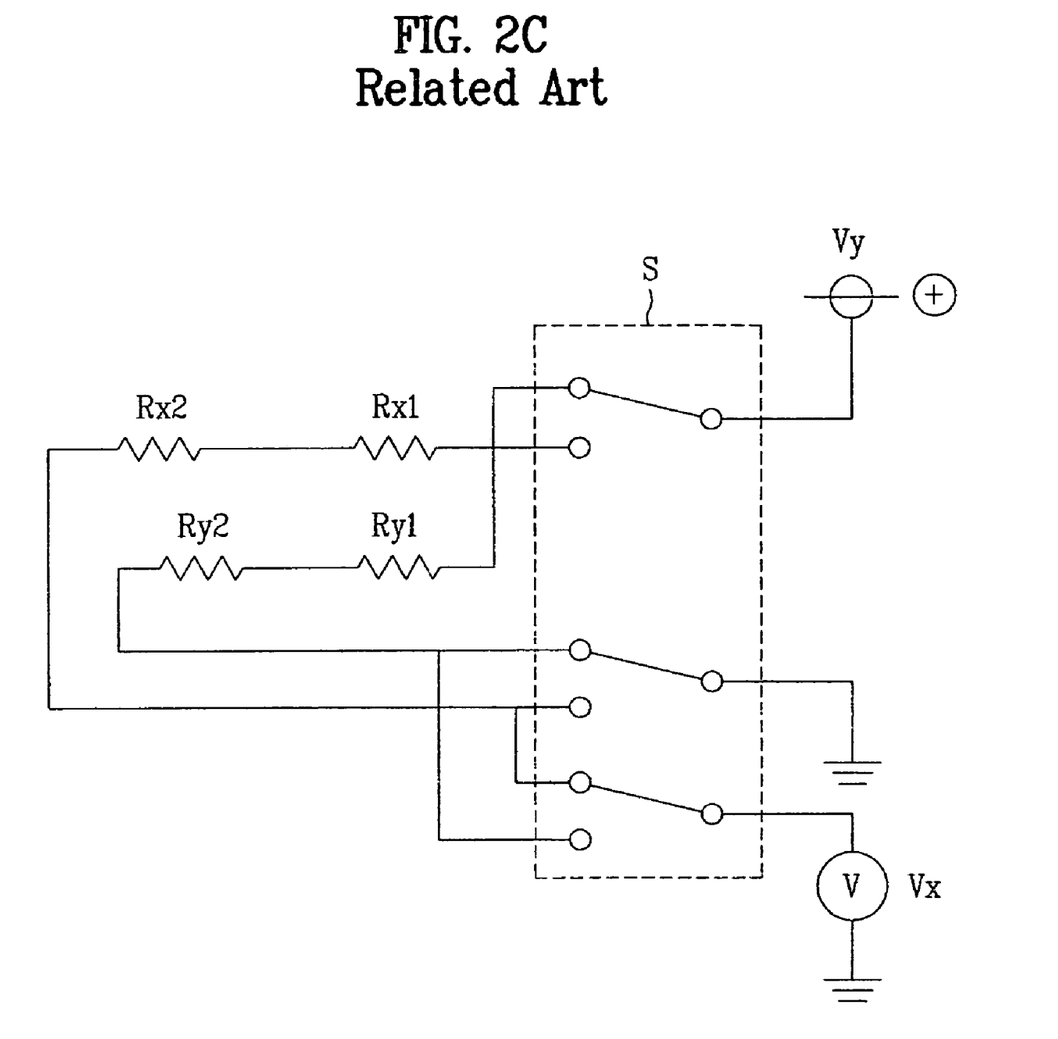

FIG. 1 illustrates a cross-sectional view of a related art resistive-type touch panel. FIGS. 2A to 2C illustrate a method by which a contact point location on a related art resistive-type touch panel is detected.

Referring to FIG. 1, related art resistive-type touch panels generally include an upper substrate 20, a lower substrate 30, and a plurality of dot spacers 50. The upper and lower substrates 20 and 30 are typically formed of an elastic material such as PET, thin glass films, etc. Upper and lower substrates 20 and 30 formed of thin glass films have isotropic optical properties. Recently, however, plastic films having isotropic optical properties have been used as upper and lower substrates 20 and 30. A polarizing plate (not shown) is usually formed on the surface of the glass substrate to decrease surface reflectivity of the resistive-type touch panel. A first transparent electrode 21 is formed on a lower surface of the upper substrate 20 while a second transparent electrode 22 is formed on an upper surface of the lower substrate 30. The upper and lower substrates 20 and 30 are boded to each other via an adhesive material 40 having a thickness of 75 µm to 200 µm. The plurality of dot spacers 50, spaced apart from each other by a distance of between 100 µm and 300 µm, are formed between the upper and lower substrates 20 and 30 to electrically insulate the upper substrate 20 from the lower substrate 30 during an initial state. However, when a contact object "B" (e.g., a stylus pen) contacts and presses upon a portion the upper substrate 20 "A", a portion of the upper substrate 20 contacts the lower substrate 30, as shown in FIG. 2A. Further referring to FIG. 2A, a signal line 60 is provided between the upper and lower substrates 20 and 30 within the adhesive material 40.

Referring to FIG. 2B, first metal electrodes 80 are formed in left and right peripheral regions of the upper substrate 20 and second metal electrodes 70 are formed in upper and lower peripheral regions of the lower substrate 30.

Referring to FIG. 2C, the coordinates of any contact point generated on the aforementioned related art resistive-type touch panel are determined using two pairs of resistors (Rx1, Rx2) and (Ry1, Ry2) connected in series, a power source terminal, and a switching part S. The power source terminal applies a voltage (Vx, Vy) to predetermined ones of the resistor pairs via the switching part S.

Referring to FIGS. 2A to 2C, when a contact point "A" is generated with a contact object "B" (e.g., stylus pen), the upper substrate 20 contacts the lower substrate 30 at contact point "A". Next, an X-axis voltage Vx is applied between the second metal electrodes 70 of the lower substrate 30 and a potential gradient is thereby generated on a an electrically resistive surface between the second metal electrodes 70. Accordingly, a resultant voltage is received by the first metal electrode 80 of the upper substrate 20 and transmitted to a controller where an X-axis coordinate of the contact point "A" is calculated. Next, a Y-axis voltage Vy is applied between the first metal electrodes 80 of the upper substrate 20 and a potential gradient is thereby generated on an electrically resistive surface between the first metal electrodes 80. Accordingly a resultant voltage is received by the second metal electrodes 70 of the lower substrate 30 and transmitted to the controller where a Y-axis coordinate of the contact point "A" is calculated. As a result, the location of the contact point "A" on a display surface is determined. With the location of the contact point "A" determined, the contact point "A" may be displayed at a corresponding position by the display surface. The process described above is repetitively performed at a high speed, thereby allowing the location of the contact point "A" to be continuously determined and displayed by the display surface. As a result, a user can write letters, draw lines, etc. on the display surface via the related art resistive-type touch panel.

Figure 3:
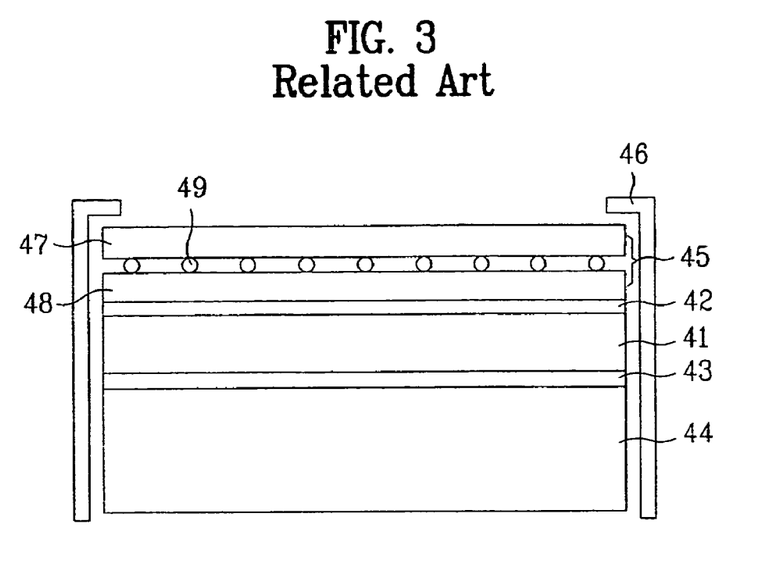
FIG. 3 illustrates a cross-sectional view of a resistive-type touch panel integrated with a liquid crystal display (LCD) device.

FIG. 3 illustrates a cross-sectional view of a resistive-type touch panel integrated with a liquid crystal display (LCD) device.

Referring to FIG. 3, the aforementioned related art resistive-type touch panel is integrated with an LCD device having an LCD panel, wherein the LCD panel and the resistive-type touch panel are secured together by a case top. Accordingly, a related art resistive-type touch panel integrated with an LCD device includes an LCD panel 41, an upper polarizing plate 42, a lower polarizing plate 43, a backlight 44, a resistive-type touch panel 45, and a metal case top 46.

The LCD panel 41 is capable of displaying images in accordance with externally input driving and video signals and includes upper and lower substrates bonded to each other and spaced apart from each other by a predetermined distance, wherein liquid crystal material is injected between the upper and lower substrates. The upper polarizing plate 42 is arranged over the LCD panel 41 and the lower polarizing plate 43 is arranged beneath the LCD panel 41 to selectively polarize light irradiated by the backlight 44 into the LCD panel 41 as well as emitted light transmitted by the LCD panel 41. The resistive-type touch panel 45 is formed above the LCD panel 41 and outputs a variable voltage in accordance with a location of the contact point on the touch panel. The case top 46 is provided as a metal material that secures the backlight 44, the LCD panel 41, and the resistive-type touch panel 45 together as a single body.

As mentioned above with respect to FIGS. 1-2C, the resistive-type touch panel 45 includes transparent electrodes (not shown) formed on opposing surfaces of bonded upper and lower substrates 47 and 48. A plurality of dot spacers 49 formed within a viewing area between the upper and lower substrates 47 and 48 to uniformly maintain the distance between the upper and lower substrates 47 and 48. The upper and lower substrates 47 and 48 are bonded to each other via an adhesive material (not shown) provided in a dead space region.

Touch panels are integrated with display devices based on their suitability for a given application. For example, the related art resistive-type touch panel is beneficially integrated with display devices used where low price, high yield, comfortable writing sensation, etc., are important considerations. However, the related art resistive-type touch panels are not suitably integrated with all types of display devices. For example, an electromagnetic (EM)-type touch panels are beneficially integrated with industrial display devices where requiring electro-optical, insulating and endurance characteristics.

Figure 4:
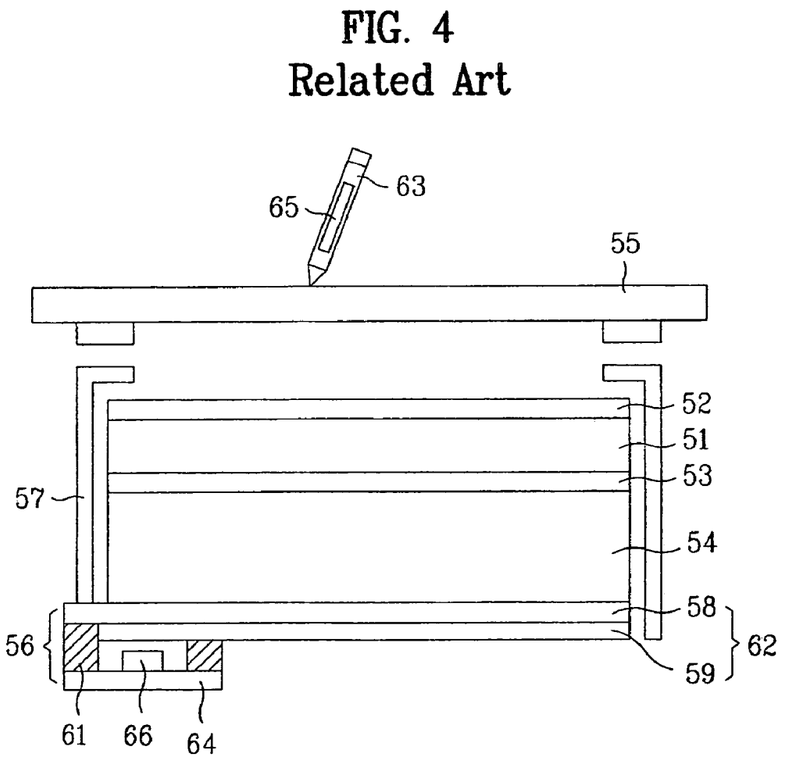
FIG. 4 illustrates a cross-sectional view of a related art electromagnetic (EM)-type touch panel.

FIG. 4 illustrates a cross-sectional view of a related art electromagnetic (EM)-type touch panel.

Referring to FIG. 4, a related art EM-type touch panel is integrated with a display device such as an LCD device, wherein the LCD device includes an LCD panel 51, an upper polarizing plate 52, a lower polarizing plate 53, a backlight 54, a passivation layer 55, an EM-type touch panel 56, and a case top 57.

The LCD panel 51 is capable of displaying images in accordance with externally input driving and video signals and includes upper and lower substrates bonded to each other and spaced apart from each other by a predetermined distance, wherein liquid crystal material is injected between the upper and lower substrates. The upper polarizing plate 52 is arranged over the LCD panel 51 and the lower polarizing plate 53 is arranged beneath the LCD panel 53 to selectively polarize light irradiated by the backlight 54 into the LCD panel 51 as well as emitted light transmitted by the LCD panel 51. Arranged above and spaced apart from the upper polarizing plate 52, the passivation layer 55 serves as a dielectric layer as well as protects the LCD panel 51 from a proximately arranged stylus pen 63, as will be discussed in greater detail below. The EM-type touch panel 56 is arranged below the LCD panel 51 and outputs a variable voltage in accordance with a location of the contact point on the touch panel. The case top 45 is provided as a metal material that secures the backlight 54, the LCD panel 51, and the EM-type touch panel 56 together as a single body.

The EM-type touch panel 56 includes a sensor board 62 having a sensor PCB 58, a shield plate 59, and a connector 61 to generate electromagnetic fields; and a control board 64 having a microprocessor 66 for transmitting signals to the sensor board 62 and for detecting coordinates of contact point generated by a stylus pen 63 by detecting input signals generated by the stylus pen 63, wherein the stylus pen 63 includes a resonance circuit 65 having a coil and a capacitor. The electromagnetic field generated from the sensor board 62 is stored in the resonance circuit 65 of the stylus pen 63 for a predetermined amount of time.

During operation of the related art EM-type touch panel shown in FIG. 4, a control signal is generated by the control board 64 which, in turn, enables the sensor board 62 to generate an electromagnetic field. Subsequently, a current is induced within a stylus pen 63 arranged within the generated electromagnetic field, wherein the induced current has a resonant frequency and is stored for a predetermined amount of time in accordance with an LC value of the resonance circuit 65. The sensor board 62 then detects the induced current stored within the resonance circuit 65 and transmits a corresponding signal to the control board 64 whereby the control board 64 determines the location of the contact point generated by the stylus pen 63.

The resonance circuit 65 is provided as an LRC circuit, wherein the amplitude of the induced current varies with the frequency of an applied power source. The amplitude of the induced current is maximized at a predetermined resonance frequency (f) of the applied power source. More specifically, the resonance frequency (f) is determined by the following equation:

$$f = (2\pi\sqrt{LC})^{-1}$$

(L is an inductance value of an inductor, and C is a capacitance value of a capacitor).

As can be seen from the above discussion, related art EM-type touch panels determine the contact point of a stylus pen using the resonance frequency of transmitted electromagnetic fields, thereby detecting contact points according to a completely different method resistive-type touch panels use to detect contact points. The EM-type touch panel has high endurance characteristics and high-quality image transmission. Because the stylus pen is arranged within the generated electromagnetic field, the location of the stylus pen relative to the EM-type touch panel can be detected even when it is above the passivation layer so that hovering and variable pressure effects can differentiated. Further, contact objects, lines may be drawn using contact objects other than a user's finger. EM-type touch panels, therefore, are commonly designed for use in settings such as conferences, seminars, etc., to eliminate the number of potential contact objects from disturbing the EM-type touch panel. The related art EM-type touch panel, however, has a complex circuit structure and is difficult to integrate with existing liquid crystal display modules (LCMs). Moreover, related art EM-type touch panels respond only to corresponding stylus pens, thereby making it difficult apply EM-type touch panels for use in certain applications (e.g., industrial fields). Lastly, if a contact object such as a user's finger contacts the related art EM-type touch panel, no contact points are detected. Accordingly, if a stylus pen becomes lost or damaged, the EM-type touch panel becomes inoperable until a new stylus pen is provided.

SUMMARY OF THE INVENTION

Accordingly, the present invention is directed to a touch panel for a display device that substantially obviates one or more of the problems due to limitations and disadvantages of the related art.

An advantage of the present invention provides a touch panel for a display device, wherein benefits of resistive-type and EM-type touch panels are integrated into a single system, thereby obtaining advantageous characteristics such as detecting a contact point via hovering above, and direct contact with, the touch panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch panel for a display device may, for example, include a display device for displaying a picture image according; a resistive-type touch panel arranged above the display device; and an EM-type touch panel arranged below the display device.

In one aspect of the present invention, the display device may be provided as an LCD device, wherein the LCD device may, for example, include an LCD panel having lower and upper substrates bonded to each other and spaced apart from each other at a uniform distance, and a liquid crystal layer arranged between the lower and upper substrates; lower and upper polarizing plates respectively adhering to lower surface and upper surfaces of the LCD panel for polarizing light; and a backlight arranged below the LCD panel for substantially uniformily emitting light toward the lower surface of the LCD panel.

In another aspect of the present invention, the resistive-type touch panel may, for example, include upper and lower substrates each having transparent electrodes arranged thereon and patterned spacers arranged between the upper and lower substrates.

In still another aspect of the present invention, the upper and lower substrates may be bonded to each other via an adhesive material provided in a dead space region of the resistive-type touch panel.

In yet another aspect of the present invention, the EM-type touch panel may, for example, include a sensor board arranged below the display device, wherein an electromagnetic field is generatable by the sensor board; and a control board arranged below the sensor board, wherein the a signal is transmittable from the control board to the sensor board and wherein coordinates of a contact point on the EM-type touch panel generated by a contact object are detectable upon reading an input signal.

In still another aspect of the present invention, the control board may, for example, include a first driving part capable of detecting a capacitance below 10 pF upon being contacted by contact objects (e.g., a user's finger) and driving the resistive-type touch panel; a second driving part capable of detecting an electromagnetic field of contact objects such as a stylus pen and driving the EM-type touch panel; and a third driving part for selectively switching a driving operation between the first driving part and the second driving part.

In yet another aspect of the present invention, the sensor board may, for example, include a sensor PCB, a shield plate, and a connector.

In still another aspect of the present invention, the sensor PCB may be connected to the shield plate via an adhesive.

In another aspect of the present invention, the touch panel may further include a metal case top for securing the display device and the touch panel as an integral body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

As shown in the Figures, the touch panel according to the principles of the present invention may be integrated with a display device such as a liquid crystal display (LCD) device. It will be readily appreciated, however, that the concepts of the present invention may be readily extended to integrate the touch panel with substantially any type of display device such as a Cathode Ray Tube (CRT), Plasma Display Panel (PDP), Electro Luminescent Display (ELD), Vacuum Fluorescent Display (VFD), and the like.

Figure 5:
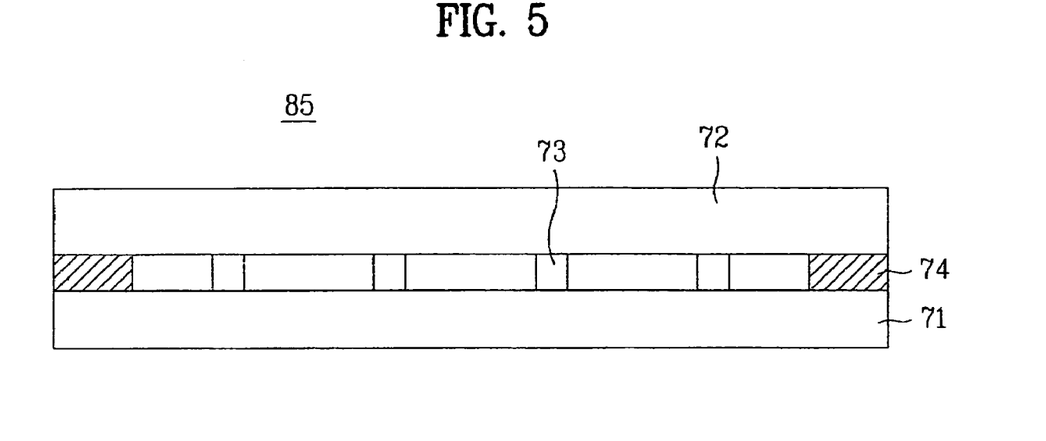
FIG. 5 illustrates a cross-sectional view of a resistive-type touch panel according to principles of the present invention.

FIG. 5 illustrates a cross-sectional view of a resistive-type touch panel according to principles of the present invention.

Referring to FIG. 5, the resistive-type touch panel 85 may, for example, include a lower substrate 71 and an upper substrate 72 bonded together via an adhesive material 74 provided in a dead space region. Transparent electrodes (not shown) may be formed on opposing surfaces of the lower and upper substrates 71 and 72 and patterned spacers 73 may be arranged between the lower and upper substrates 71 and 72 for maintaining a substantially uniform distance between the lower and upper substrates 71 and 72. In one aspect of the present invention, the transparent electrodes may be formed of a material such as Indium-Tin-Oxide (ITO), Tin-Antimony-Oxide (TAO), or the like. In another aspect of the present invention, the patterned spacers 73 may be formed of an insulating material such as silicon nitride, silicon oxide, Benzocyclobutene (BCB), acrylic resin, or the like. Formed as described above, the resistive-type touch panel 83 may substantially minimize a rippling effect of liquid crystal material within an LCD panel upon being contacted with a contact object.

Figure 6:
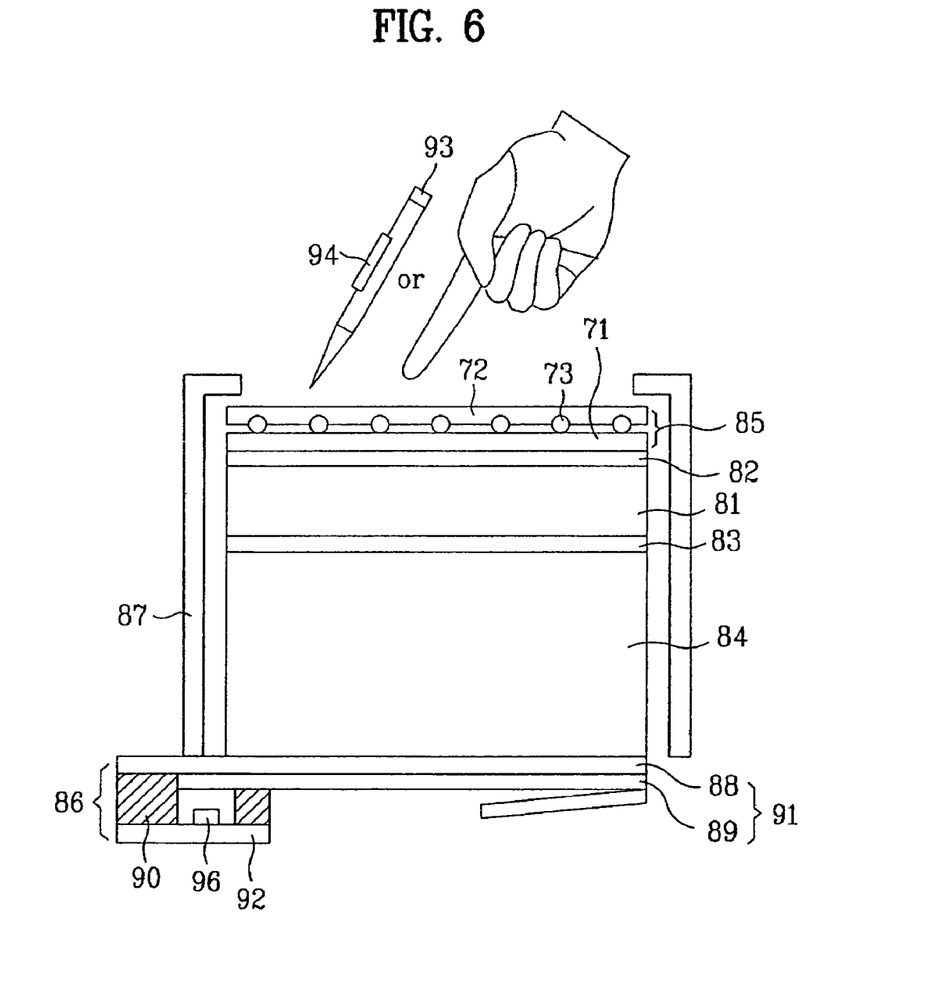
FIG. 6 illustrates a cross-sectional view a touch panel incorporated with a display device according to principles of the present invention.

FIG. 6 illustrates a cross-sectional view a touch panel incorporated with a display device according to principles of the present invention.

Referring to FIG. 6, the touch panel according to principles of the present invention may, for example, be integrated with a display device such as a (LCD) device.

The LCD device may, for example, include an LCD panel 81, an upper polarizing plate 82, a lower polarizing plate 83, and a backlight 84. The LCD panel 81 may, for example, be capable of displaying images in accordance with externally input driving and video signals. Moreover, the LCD panel 81 may, for example, include upper and lower substrates bonded to, and spaced apart from, each other by a predetermined distance, wherein liquid crystal material may be provided (e.g., injected, dispensed, etc.) between the upper and lower substrates. The upper polarizing plate 82 may be arranged over the LCD panel 81 and the lower polarizing plate 83 may be arranged beneath the LCD panel 81 to selectively polarize light irradiated by the backlight 84 into the LCD panel 84 as well as emitted light transmitted by the LCD panel 81.

According to principles of the present invention, the touch panel may, for example, include the aforementioned resistive-type touch panel 85 and an EM-type touch panel 86. In one aspect of the present invention, the resistive-type touch panel 85 may be arranged above the display surface of the display device (e.g., over the LCD panel 81), while the EM-type touch panel 86 may be arranged below the display surface of the display device (e.g., below the LCD panel 81). In one aspect of the present invention, a case top 87 may be provided as a structure capable of securing the LCD device and the touch panel together as a single body. In another aspect of the present invention, the case top 87 may be formed of a material such as metal.

The EM-type touch panel 85 may, for example, include a sensor board 91 and a control board 92. The sensor board 91 may generate electromagnetic fields and include a sensor PCB 88, a shield plate 89, and a connector 90. In one aspect of the present invention, the sensor PCB 88 may be connected to the shield plate 89 by an adhesive. The control board 92 may be arranged beneath, and be electrically coupled to, the sensor board 92. In one aspect of the present invention, the control board 92 may also be electronically coupled to the resistive-type touch panel 83. The control board 92 may support a microprocessor 96 that transmits signals to the sensor board 92 and may receive input signals to detect contact points generated by a stylus pen 93. In one aspect of the present invention, control board 92 may also receive input signals to detect contact points generated by contact objects other than the stylus pen 93 (e.g., a user's finger, etc.).

As will be discussed in greater detail below, the stylus pen 93 may, for example, include a coil and a capacitor arranged within a resonance circuit 94. Accordingly, electromagnetic fields generated by the sensor board 91 may be stored within the resonance circuit 94 for a predetermined amount of time. In one aspect of the present invention, the connector 90 may include about 50 fins.

Figure 7:
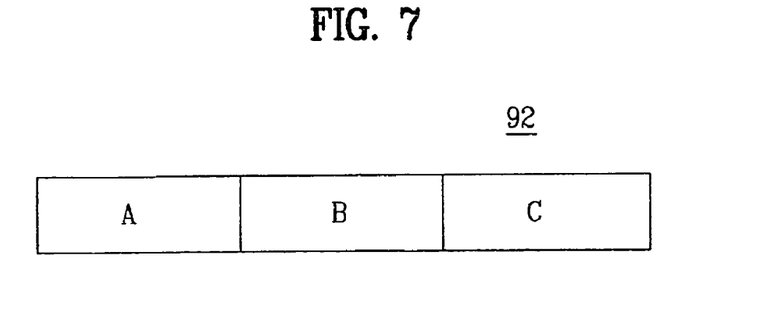
FIG. 7 illustrates a schematic view of a control board shown in FIG. 6.

FIG. 7 illustrates a schematic view of a control board shown in FIG. 6.

Referring to FIG. 7, the control board 92 is comprised of three driving parts A, B, and C. The first driving part, A, may drive the resistive-type touch panel 83 and detect capacitance values below 10 pF, generated from users when the surface of the resistive-type touch panel 83 is contacted by contact objects such as a user's fingers. The second driving part, B, may drive the EM-type touch panel 86 and detect electromagnetic fields generated by the stylus pen 93. The third driving part, C, may switch between the resistive-type touch panel 83 and the EM-type touch panel 86, enabling either type of touch panel to be driven by their respective driving parts. Accordingly, errors generated when, for example, a user's finger and the stylus 93 simultaneously contact the touch panel may be substantially prevented from occurring because the resistive-type or EM-type touch panels are individually activated.

When, for example, the EM-type touch panel described above with respect to FIG. 6 is activated and driven via the second and third driving parts B and C, a control signal may be generated by the control board 92 which, in turn, enables the sensor board 91 to generate an electromagnetic field. Subsequently, a current is induced within a stylus pen 93 arranged within the generated electromagnetic field, wherein the induced current has a resonant frequency and is stored for a predetermined amount of time in accordance with an LC value of the resonance circuit 94. The sensor board 91 may then detect the induced current stored within the resonance circuit 94 and transmit a corresponding signal to the control board 92 whereby the control board 92 determines the location of the location of the contact point generated by the stylus pen 93.

According to principles of the present invention, the resonance circuit may comprise an LRC circuit, wherein the amplitude of the induced current may vary with the frequency of the electromagnetic field generated by the sensor board 91. The amplitude of the induced current may be maximized when the frequency of the electromagnetic field generated by the sensor board 91 equals a predetermined, resonance frequency (f) specific to the LC value of the resonance circuit 94. According to principles of the present invention, the resonance frequency (f) may be determined by the following equation:

$$f = (2\pi\sqrt{LC})^{-1}$$

(L is an inductance value of an inductor, and C is a capacitance value of a capacitor).

When, for example, the resistive-type touch panel 85 described above with respect to FIGS. 5 and 6, is activated and driven via the first and third driving parts A and C, and upon the contacting the resistive-type touch panel 85 with a contact object, the upper substrate 72 contacts the lower substrate 71. Next, an X-axis voltage may be applied to the metal electrodes of the lower substrate 71 and a potential gradient is thereby generated on an electrically resistive surface between the metal electrodes. Accordingly, a resultant voltage may be received by the metal electrodes of the upper substrate 72 and transmitted to a microprocessor 96 where an X-axis coordinate of the contact point is calculated. Next, a Y-axis voltage may be applied to the metal electrodes of the upper substrate 72 and a potential gradient may thereby be generated on an electrically resistive surface between the metal electrodes. Accordingly, a resultant voltage may be received by the metal electrodes of the lower substrate 71 and transmitted to the controller where a Y-axis coordinate of the contact point may be calculated. As a result, the location of a contact point on a display surface of the display device 81 may be determined. With the location of the contact point determined, the contact point may be displayed at a corresponding position by the display surface. The process described above may be repetitively performed at a high speed, thereby allowing the location of the contact point to be continuously determined and displayed by the display surface. As a result, a user can write letters, draw lines, etc. on the display surface via the related art resistive-type touch panel.

Figure 8:
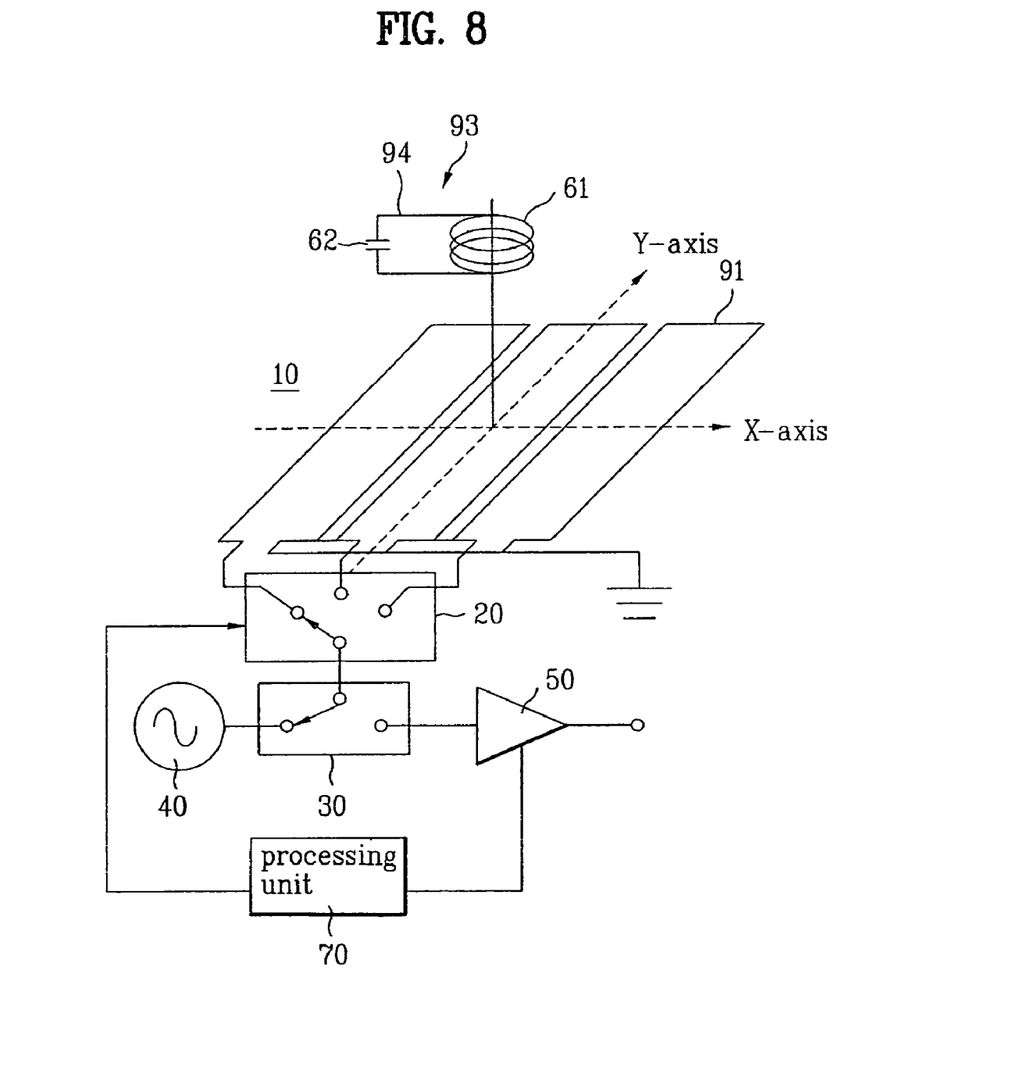
FIG. 8 illustrates a method for detecting coordinates of a contact point of a stylus pen with respect to a sensor board of an EM-type touch panel.

FIG. 8 illustrates a method of detecting coordinates of a contact point generated by a stylus pen.

Referring to FIG. 8, the EM-type touch panel 86 may, for example, include the sensor board 91 having the sensor PCB 88. As mentioned above, the stylus pen 93 includes the resonance circuit 94. In one aspect of the present invention, the resonance circuit 94 may, for example, include an induction coil 61 and a capacitor 62. In another aspect of the present invention, the sensor board 91 may further include a sensor array 10 while the sensor PCB 88 may, for example, include a select circuit 20, a connection switching circuit 30, a transmitting circuit 40, a receiving circuit 50, and a processing unit 70. In another aspect of the present invention, the sensor array 10 may, for example, include a plurality of antenna coils 95 having a plurality of conductors arranged parallel to each other along a first predetermined direction (e.g., the Y-axis). In still another aspect of the present invention, a plurality of antenna coils (not shown) having a plurality of conductors arranged in parallel to each other along a second predetermined direction, perpendicular to the first predetermined direction (e.g., the X-axis) may overlap the plurality of antenna coils 95. In yet another aspect of the present invention each of the plurality of antenna coils 95 may comprise first and second ends, wherein the first end is connected to the select circuit 20 and wherein the second end is connected to a ground voltage source.

According to principles of the present invention, contact points made on the EM-type touch panel may be determined based on the interaction of electromagnetic fields generated between the sensor board 88 and the stylus pen 93. Based on information provided from the processing circuit 70, the select circuit 20 may select one of the plurality of antenna coils 95 arranged along the X- and Y-axes. Subsequently, the connection switching circuit 30 alternately connects the selected antenna coil 95 between the transmitting circuit 40 and the receiving circuit 50. Next, the transmitting circuit 40 may apply an AC signal through the connection switching circuit 30, enabling the sensor board 91 to generate an alternating electromagnetic field which then induces a current within the resonance circuit 701 by virtue of Faraday's law. Subsequently, a signal corresponding to the selected antenna coil 95 may be generated within the resonance circuit 701 and applied sequentially to the select circuit 20, the connection switching circuit 30, and the receiving circuit 50. The aforementioned process may be repeated for each of the plurality of antennal coils 91 such that an X-axis coordinate value of the contact point is determined by the processing unit 70. Moreover, the aforementioned processed may be performed for the plurality of antenna coils having the plurality of conductors arranged in parallel to each other along the X-axis such that a Y-axis coordinate value of the contact point may also be determined.

Figure 9:
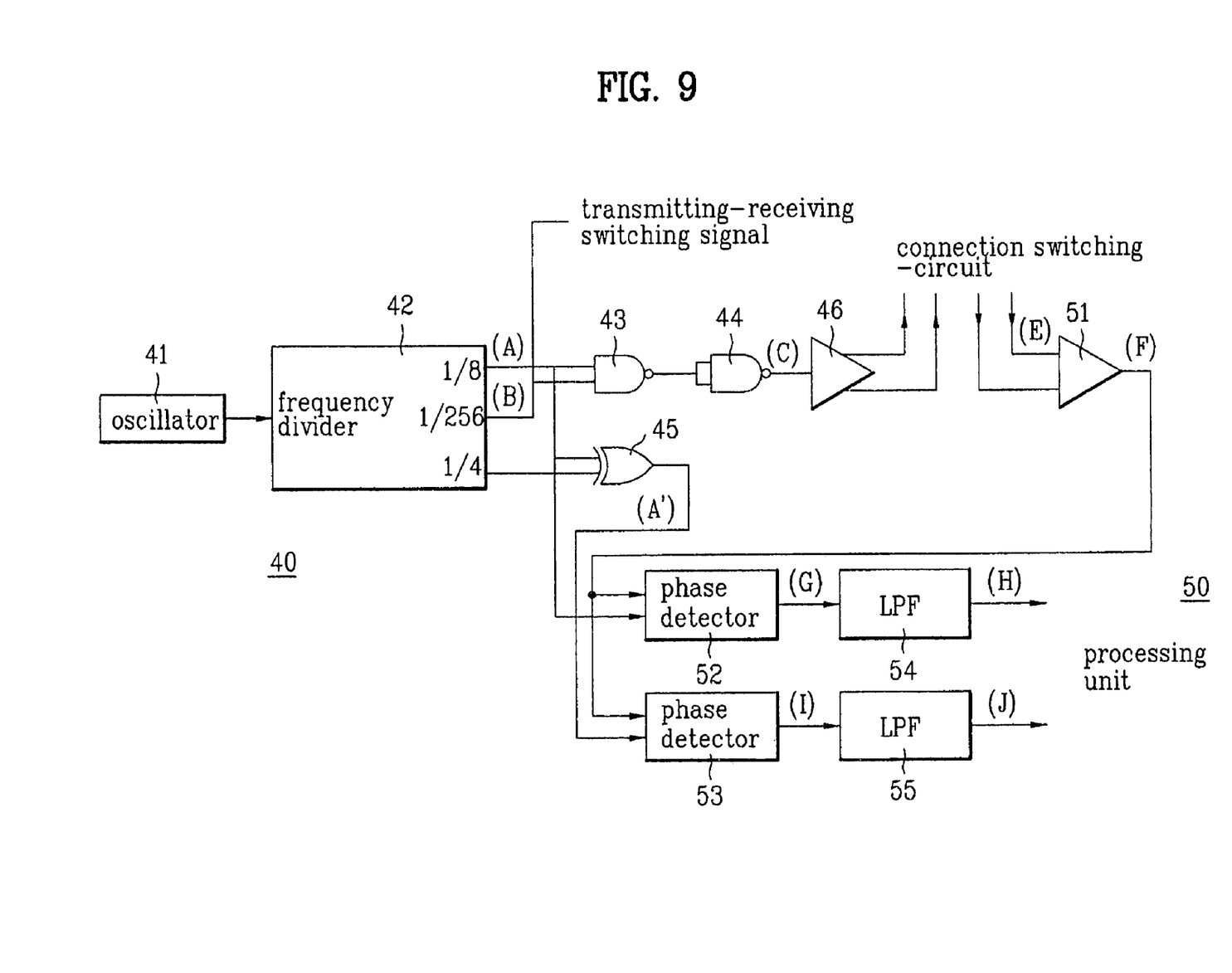
FIG. 9 illustrates the transmitting and receiving circuits shown in FIG. 8.

FIG. 9 illustrates transmitting and receiving circuits shown in FIG. 8.

Referring to FIG. 9, the transmitting circuit 40 may, for example, include an oscillator 41, a frequency divider 42, first and second NAND gates 43 and 44, respectively, an EXOR gate 45, and a driving circuit 46. The receiving circuit 50 may, for example, include an amplifier 51, first and second phase detectors 52 and 53, respectively, and first and second low-pass filters 54 and 55, respectively.

Figure 10:
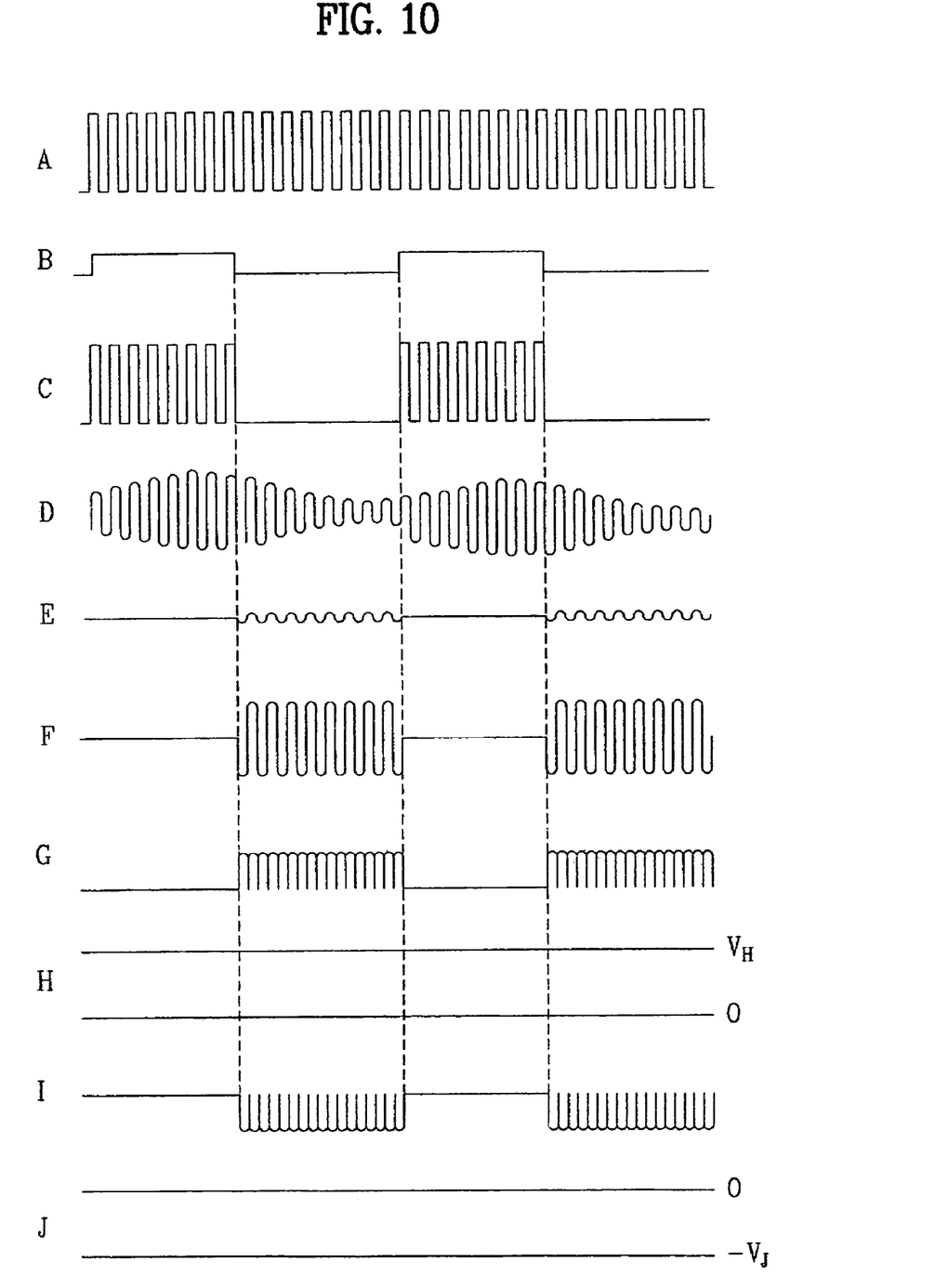
FIG. 10 illustrates waveform diagrams of the transmitting and receiving circuits shown in FIG. 9.

FIG. 10 illustrates waveform diagrams of the transmitting and receiving circuits shown in FIG. 9.

Referring to FIGS. 9 and 10, when electromagnetic fields are transmitted and received between the sensor array 10 and the stylus pen 93, a clock pulse having a predetermined frequency (e.g., 4 MHz), generated by the oscillator 41, may be divided by the frequency divider 42 into a plurality of frequencies having values ¼, ⅛, and ¹⁄₂₅₆ the predetermined frequency. Subsequently, a pulse signal, A, having the ⅛ divided frequency (e.g., 500 kHz) may be input to a first input terminal of the first NAND gate 43 and a transmitting-receiving switching signal, B, having the ¹⁄₂₅₆ divided frequency (e.g., 15.625 kHz) may be input to a second input terminal of the first NAND gate 43. Next, the pulse signal, A, and the transmitting-receiving switching signal, B, may be calculated and inverted by the second NAND gate 44 and outputted as output signal, C, for determining whether the pulse signal, A, is output at intervals of, for example, about 32 μsec. The driving circuit 46 then converts the output signal C to an average signal and transmits the average signal to the selected antenna coil 95 of the sensor array 10 via the connection switching circuit 30 and the select circuit 20. Accordingly, the selected antenna coil 95 may generate an electromagnetic field based on the output signal C.

When the stylus pen 94 is arranged (e.g., substantially perpendicular to the touch panel) within the perimeter of the selected antenna coil 95, the generated electromagnetic field excites the induction coil 61 of the stylus pen 94 to generate an induction voltage D, synchronized with the output signal C, wherein the current associated with the induction voltage D is stored by the capacitor 62. Next, the connection switching circuit 30 switches the electrical connection of the selected antenna coil 95 from the transmitting circuit 40 to the receiving circuit 50 in accordance with the transmitting-receiving switching signal B. After being electrically the connected to the receiving circuit 50, the selected antenna coil 95 ceases to generate the electromagnetic field.

Accordingly, the current associated with the induction voltage D, and stored within the capacitor 62, may then be discharged by the induction coil 61 to inversely excite the selected antenna coil 95 connected to the receiving circuit 50. Accordingly, a current corresponding to the induction voltage D may be induced within the selected antenna coil 95 to generate a received signal E.

The received signal E then amplified by the amplifier 51, to generate an amplified signal F. The amplified signal F is then transmitted to the first and second phase detectors 52 and 53, respectively. In one aspect of the present invention, the first pulse signal A may be input to the first phase detector 52 as a detection signal. Accordingly, when the phases of the first pulse signal A and amplified signal F are the same, the amplified signal F is positively inverted, thereby generating a first inverted signal G. The first inverted signal G is then passed through a first low-pass filter 54 having a low cut-off frequency and converted to a first average signal H having a first voltage, +$V_H$. The first voltage +$V_H$ is then transmitted to the processing unit 70. In another aspect of the present invention, the first pulse signal A and a second pulse signal, having a frequency twice that of the first pulse signal A, may be input to the EXOR gate 45, wherein an output signal A' is generated. In one aspect of the present invention, frequency of the output signal A' may be equal to the frequency of the first pulse signal A. In another aspect of the present invention, the phase of the output signal A' shifted by 90° as compared to the phase of the first pulse signal A. Subsequently, the output signal A' may be input to the second phase detector 53 as a detection signal. When the phases of the output signal A' and the amplified signal F are the same, the amplified signal F is negatively inverted, thereby generating a second inverted signal I. The second inverted signal I is then passed through a second low-pass filter 55 having a low cut-off frequency and converted to a second average signal J having a second voltage $-V_J$. The second voltage $-V_J$ is then transmitted to the processing unit 70.

When a switch of the stylus pen 93 is turned off, the phase and frequency of the voltage corresponds to the phase and frequency of the stored current within the resonance circuit 94. As a result, the phase of the amplified signal F is equal to the phase of the first pulse signal A, and the first voltage $+V_H$ is generated by the first average signal H. When the switch of the stylus pen 93 is turned on, the phase of the stored current is shifted to the phase of the voltage at the predetermined angle. As a result, the phase of the amplified signal F is shifted to the phase of the output signal A' and the first and second voltages $+V_H$ and $-V_J$ are generated by first and second average signals H and J, wherein the voltage is generated by the second average signal J when the phase is shifted by 90°.

Received by the processing unit 70, the first and second average signals H and J are converted to digital signals and the contact point is calculated using equation (1):

$$Vx = (V^2_H + V^2_J)^{1/2} \quad (1)$$

$$V_\theta = \tan^{-1}(V_J/V_H) \quad (2)$$

Vx represents the amplitude of a detected voltage value corresponding to the distance between the stylus pen 60 and the antenna coil 95, while $V_\theta$ represents the phase of the detected voltage value. When the stylus pen 60 and the antenna coil 95 are switched, the Vx value is converted, thereby enabling the location of the stylus pen 60 to be detected. That is, the voltage $V_\theta$ is varied according to switching on/off, so that the switching on/off state is checked in a process comparing the voltage $V_\theta$ to a predetermined threshold voltage.

According to principles of the present invention, a touch panel may be integrated with a display device wherein contact points may be determined using contact objects including a stylus, a user's finger, etc., thereby increasing the convenience of the touch panel and minimizing extra costs incurred by the user should the user lose their stylus. Further, the touch panel of the present invention may be eliminate the necessity for the related art passivation layer 55 shown in FIG. 4. Moreover, a time delay between generation of the contact point and determining the location of the contact point may be minimized.

Due to the presence of the patterned spacers 73 shown in FIG. 6, the touch panel of the present invention may substantially minimize a rippling effect of liquid crystal material within an LCD panel while providing a comfortable writing sensation upon being contacted with a contact object.

Lastly, according to the present invention, contact points may be selectively made using contact objects such as a user's finger or a stylus pen. Accordingly, contact points may be detected and displayed by display surfaces of large-sized display devices while preventing errors from being generated when the touch panel is simultaneously contacted by diverse contact objects (e.g., a user's finger and stylus pen).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch panel for a display device, comprising:
   a resistive-type touch panel arranged above the display device;
   an electromagnetic (EM)-type touch panel arranged below the display device; and
   a first driving part to drive the resistive-type touch panel, wherein the first driving part generates voltages corresponding to coordinates of a location of an object contacting the touch panel using potential gradients generated across substrates of the touch panel,
   wherein the electromagnetic (EM)-type touch panel includes:
     a sensor board including a plurality of antenna coils;
     a select circuit for selecting one of the plurality of antenna coils;
     a transmitting circuit for successively applying an AC signal to the selected antenna coil selected by the select circuit to generate an electromagnetic field from the selected antenna coil;
     a stylus pen generating an induction voltage from the electromagnetic field and discharging the induction voltage to excite the selected antenna coil so that the selected antenna coil generates a received signal;
     a receiving circuit amplifying and filtering the received signal and outputting a filtered signal;
     a connection switching circuit for alternately connecting the select circuit to the transmitting circuit and the receiving circuit; and
     a processing circuit for controlling the select circuit and the connection switching circuit, and detecting a location of a contact point of the stylus pen from the filtered signal,
   wherein the transmitting circuit includes:
     an oscillator generating a clock pulse;
     a frequency divider dividing the clock pulse into first, second and third frequencies;
     a first NAND gate for calculating the second and third frequencies;
     a second NAND gate for inverting a signal outputted from the first NAND gate;
     a driving circuit converting a signal outputted from the second NAND gate to an average signal and transmitting the average signal to the selected antenna coil through the connection switching circuit and the select circuit; and
     an EXOR gate calculating the first and second frequencies, wherein the receiving circuit includes:
     an amplifier amplifying the received signal from the selected antenna coil and outputting an amplified signal;
     a first phase detector receiving the second frequency and the amplified signal from the frequency divider and the amplifier, and generating a first inverted signal;
     a second phase detector receiving a signal from the EXOR gate and the amplified signal from the amplifier, and outputting a second inverted signal;

a first low-pass filter converting the first inverted signal to a first average signal and outputting the first average signal to the a processing circuit; and a second low-pass filter converting the second inverted signal to a second average signal and outputting the second average signal to the processing circuit.

2. The touch panel of claim 1, wherein the resistive-type touch panel includes:

upper and lower substrates bonded to each other;

transparent electrodes arranged on opposing surfaces of the upper and lower substrates; and patterned spacers arranged between the upper and lower substrates.

3. The touch panel of claim 2, wherein the resistive-type touch panel further includes an adhesive material arranged in a dead space region bonding the upper and lower substrates to each other.

4. The touch panel of claim 1, further comprising a case top securing the display device, the resistive-type touch panel, and the EM-type touch panel together as a single body.

5. A touch panel display device, comprising:

a display device;

a resistive-type touch panel arranged above the display device;

an electromagnetic (EM)-type touch panel arranged below display device;

a case top securing the display device, the resistive-type touch panel, and the EM-type touch panel together as a single body; and a first driving part to drive the resistive-type touch panel, wherein the first driving part generates voltages corresponding to coordinates of a location of an object contacting the touch panel using potential gradients generated across substrates of the touch panel, wherein the electromagnetic (EM)-type touch panel includes:

a sensor board including a plurality of antenna coils;

a select circuit for selecting one of the plurality of antenna coils;

a transmitting circuit for successively applying an AC signal to the selected antenna coil selected by the select circuit to generate an electromagnetic field from the selected antenna coil;

a stylus pen generating an induction voltage from the electromagnetic field and discharging the induction voltage to excite the selected antenna coil so that the selected antenna coil generates a received signal;

a receiving circuit amplifying and filtering the received signal and outputting a filtered signal;

a connection switching circuit for alternately connecting the select circuit to the transmitting circuit and the receiving circuit; and a processing circuit for controlling the select circuit and the connection switching circuit, and detecting a location of a contact point of the stylus pen from the filtered signal, wherein the transmitting circuit includes:

an oscillator generating a clock pulse;

a frequency divider dividing the clock pulse into first, second and third frequencies;

a first NAND gate for calculating the second and third frequencies;

a second NAND gate for inverting a signal outputted from the first NAND gate;

a driving circuit converting a signal outputted from the second NAND gate to an average signal and transmitting the average signal to the selected antenna coil through the connection switching circuit and the select circuit; and an EXOR gate calculating the first and second frequencies, wherein the receiving circuit includes:

an amplifier amplifying the received signal from the selected antenna coil and outputting an amplified signal;

a first phase detector receiving the second frequency and the amplified signal from the frequency divider and the amplifier, and generating a first inverted signal;

a second phase detector receiving a signal from the EXOR gate and the amplified signal from the amplifier, and outputting a second inverted signal;

a first low-pass filter converting the first inverted signal to a first average signal and outputting the first average signal to the a processing circuit; and a second low-pass filter converting the second inverted signal to a second average signal and outputting the second average signal to the processing circuit.

* * * * *